United States Patent
Schwetman, Jr. et al.

(10) Patent No.: US 9,229,163 B2
(45) Date of Patent: Jan. 5, 2016

(54) BUTTERFLY OPTICAL NETWORK WITH CROSSING-FREE SWITCHES

(71) Applicant: Oracle International Corporation, Redwood City, CA (US)

(72) Inventors: Herbert D. Schwetman, Jr., Austin, TX (US); Michael O. McCracken, San Diego, CA (US); Pranay Koka, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 399 days.

(21) Appl. No.: 13/666,521

(22) Filed: Nov. 1, 2012

(65) Prior Publication Data

US 2013/0308944 A1    Nov. 21, 2013

Related U.S. Application Data

(60) Provisional application No. 61/648,811, filed on May 18, 2012.

(51) Int. Cl.
| | |
|---|---|
| *G02B 6/12* | (2006.01) |
| *G02B 6/35* | (2006.01) |
| *G02B 6/43* | (2006.01) |
| *H04J 14/02* | (2006.01) |
| *H04Q 11/00* | (2006.01) |

(52) U.S. Cl.
CPC .............. *G02B 6/12007* (2013.01); *G02B 6/43* (2013.01); *H04J 14/0212* (2013.01); *H04Q 11/0005* (2013.01); *G02B 2006/12085* (2013.01); *G02B 2006/12145* (2013.01); *G02B 2006/12164* (2013.01); *H04Q 2011/0052* (2013.01)

(58) Field of Classification Search
None
See application file for complete search history.

(56) References Cited

U.S. PATENT DOCUMENTS

| 5,532,855 | A  * | 7/1996 | Kato et al. ............... 398/55 |
| 2002/0039464 | A1 * | 4/2002 | Yoshimura et al. ............ 385/14 |
| 2005/0041906 | A1 * | 2/2005 | Sugama et al. ................. 385/14 |
| 2006/0261432 | A1 * | 11/2006 | Yoshimura et al. ........... 257/462 |

OTHER PUBLICATIONS

Chan, Johnnie et al. "Architectural Design Exploration of Chip-Scale Photonic Interconnection Networks Using Physical-Layer Analysis", IEEE 978-1-55752-884-1/10/$26.00 2010 IEEE, OSA/OFC,NFOEC 2010.

(Continued)

*Primary Examiner* — Michelle R Connelly
(74) *Attorney, Agent, or Firm* — Park, Vaughan, Fleming & Dowler LLP; Steven E. Stupp (57) ABSTRACT

In a multi-chip module (MCM), optical waveguides in a first plane convey modulated optical signals among integrated circuits (which are sometimes referred to as 'chips'). Moreover, an optical-butterfly switch, optically coupled to the optical waveguides, dynamically allocates communication bandwidth among the integrated circuits. This optical-butterfly switch includes optical components in the first plane and a second plane, and optical couplers that couple the modulated optical signals to and from the first plane and the second plane. In this way, the MCM communicates the modulated optical signals among the integrated circuits without optical-waveguide crossings in a given plane.

20 Claims, 6 Drawing Sheets

(56) References Cited

OTHER PUBLICATIONS

Batten, Christopher et al. "Building Many-Core Processor-to-DRAM Networks with Monolithic CMOS Silicon Photonics", Published by IEEE Computer Society 0272-1732/09/$26.00 2009 IEEE.
Petracca, Michele et al. "Design Exploration of Optical Interconnection Networks for Chip Multiprocessors", 16th IEEE Symposium on High Performance Interconnects, 1550-4797/08 $25.00 2008 IEEE DOI 10.1109/HOTI.2008.20, IEEE Computer Society.
Shacham, Assaf et al. "Photonic NoC for DMA Communications in Chip Multiprocessors", 15th IEEE Symposium on High-Performance Interconnects, 1550-4797/07 $25.00 2007 IEEE, DOI 10.1109/HOTI. 2007.9, IEEE Computer Society.
Vantrease, Dana et al. "Corona: System Implications of Emerging Nanophotonic Technology", International Symposium on Computer Architecture, 1063-6897/08 $25.00 2008 IEEE, DOI 10.1109/ISCA.2008.35, IEEE Computer Society.

* cited by examiner

BUTTERFLY OPTICAL NETWORK WITH CROSSING-FREE SWITCHES

CROSS-REFERENCE

This application claims priority under 35 U.S.C. §119(e) to U.S. Provisional Application No. 61/648,811, entitled "All-Optical Multi-Layer Butterfly Network Using Crossing-Free 4×4 Switches," by Herbert D. Schwetman, Michael O. McCracken, and Pranay Koka, filed on May 18, 2012, the contents of which are herein incorporated by reference.

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure generally relates to optical networks. More specifically, the present disclosure relates to a multi-chip module (MCM) that includes integrated circuits that communicate via a butterfly optical network without optical-waveguide crossings in a single layer of the butterfly optical network.

2. Related Art

Wavelength division multiplexing (WDM), which allows a single optical connection to carry multiple optical links or channels, can be used to provide: very high bit rates, very high bandwidth densities and very low power consumption. As a consequence, researchers are investigating the use of WDM to facilitate inter-chip communication. For example, in one proposed architecture chips in an array (which is sometimes referred to as a 'macrochip,' a multi-chip module or an MCM, and the chips are sometimes referred to based on the locations or 'sites' where they are placed in the array) are coupled together by an optical network that includes optical interconnects (such as silicon optical waveguides).

In order to use photonic technology in interconnect applications, an efficient design is desired for the optical network. In particular, the optical network ideally provides: a high total peak bandwidth; a high bandwidth for each logical connection between any two sites in the array; low arbitration and connection setup overheads; low power consumption; and bandwidth reconfigurability.

A variety of optical network topologies having different characteristics and contention scenarios have been proposed to address these challenges in interconnect applications. In general, the topology for the optical network that couples the chips is dependent on application demands and on potential future improvements in optical technology. For example, some applications only require processes on each chip to communicate with one other chip or a small number of other chips. In these cases, an optical network that allows the chips to use their full optical communication bandwidth to communicate with one other chip may provide the most efficient use of optical-network communication bandwidth, and if the complexity of the optical link used to support this communication technique is not too high, then this optical network may also be the most energy-efficient choice.

A variety of such optical networks (such as: crossbar, butterfly and Clos topologies) have been designed and implemented in the electronic domain. However, when implemented in silicon photonics, such topologies often have complicated optical-waveguide routing which can result in long optical-waveguide lengths and optical-waveguide crossings. The latter are problematic because in-plane optical-waveguide crossings introduce both crosstalk and signal loss. For example, a single-plane implementation of a 16-node butterfly optical network may include a worst-case optical link with 207 optical-waveguide crossings between switch stages. Using current technology, each optical-waveguide crossing may result in approximately 0.1 dB of signal loss, which may result in 20 dB total per-optical-link signal loss. In the absence of a significant breakthrough in optical-waveguide crossing design that achieves 0.0007 dB signal loss per optical-waveguide crossing, this single-plane design is not feasible.

Hence, what is needed is an MCM with an optical network that does not suffer from the above-described problems.

SUMMARY

One embodiment of the present disclosure provides a multi-chip module (MCM). This MCM includes: integrated circuits that perform electrical-to-optical conversion based on data to provide modulated optical signals and receive data in the modulated optical signals by performing optical-to-electrical conversion; optical waveguides, in a first plane, which convey the modulated optical signals among the integrated circuits; and an optical-butterfly switch, optically coupled to the optical waveguides, which dynamically allocates communication bandwidth among the integrated circuits. Note that the optical-butterfly switch includes optical components in the first plane and a second plane, and optical couplers that couple the modulated optical signals to and from the first plane and the second plane. Moreover, the MCM communicates the modulated optical signals among the integrated circuits without optical-waveguide crossings in a given plane.

In some embodiments, the optical-butterfly switch includes a minimum number of optical couplers to avoid optical-waveguide crossings in the given plane.

Moreover, the optical-butterfly switch may include: N first optical switches having M input ports and M output ports, where the input ports are in the first plane and the output ports are in the second plane; and M second optical waveguides for the M output ports from each of the N first optical switches.

Furthermore, a given first optical switch may include M optical couplers.

Additionally, the optical-butterfly switch may receive the modulated optical signals in the first plane and may output the modulated optical signals in the first plane. For example, the optical couplers in the optical-butterfly switch may couple the modulated optical signals output by the N first optical switches in the second plane to the first plane.

Note that the given first optical switch may include I second optical switches having J input ports and J output ports in the first plane. For example, I may be 4, J may be 2, N may be 8 and M may be 4 so that the optical-butterfly switch has a total of 16 input ports and 16 output ports. Moreover, a given second optical switch may include a Mach-Zehnder interferometer.

Furthermore, inter-switch signaling among the N first optical switches in the optical-butterfly switch may be conveyed optically and/or inter-switch signaling between adjacent second optical switches in the optical-butterfly switch may be conveyed electrically.

In some embodiments, the MCM includes control logic to configure the optical-butterfly switch to dynamically allocate communication bandwidth among the integrated circuits.

In some embodiments, the first optical waveguides and the optical-butterfly switch are implemented on a substrate using silicon-on-insulator technology.

Another embodiment provides a system that includes: a set of light sources that output the optical signals having carrier wavelengths; and the MCM.

Another embodiment provides a method for communicating information in the MCM. During the method, the optical-butterfly switch is configured to dynamically allocate communication bandwidth among the integrated circuits. Then, the modulated optical signals that include the information are routed among the integrated circuits using the optical-butterfly switch, where the optical-butterfly switch is implemented using optical components in the first plane and the second plane, and the optical couplers that couple the modulated optical signals to and from the first plane and the second plane. Moreover, the modulated optical signals are communicated among the integrated circuits without optical-waveguide crossings in the given plane.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a multi-chip module (MCM), a system that includes the MCM, and a method for communicating information in the MCM are described. In this MCM, optical waveguides in a first plane convey modulated optical signals among integrated circuits (which are sometimes referred to as 'chips'). Moreover, an optical-butterfly switch, optically coupled to the optical waveguides, dynamically allocates communication bandwidth among the integrated circuits. This optical-butterfly switch includes optical components in the first plane and a second plane, and optical couplers that couple the modulated optical signals to and from the first plane and the second plane. In this way, the MCM communicates the modulated optical signals among the integrated circuits without optical-waveguide crossings in a given plane.

Using this communication technique, a single pair of integrated circuits in the MCM can communicate with their full optical communication bandwidth (at the cost of potential contention or blocking at high load). Thus, by using the optical-butterfly switch, the MCM supports maximum site-to-site communication bandwidth. Moreover, by eliminating optical-waveguide crossings in the given plane, the optical-butterfly switch may eliminate crosstalk and may have low signal loss, thereby enabling an optical network that provides a suitable balance of high communication bandwidth, low latency and low power consumption for use in the MCM and, more generally, in interconnect applications.

Figure 1:
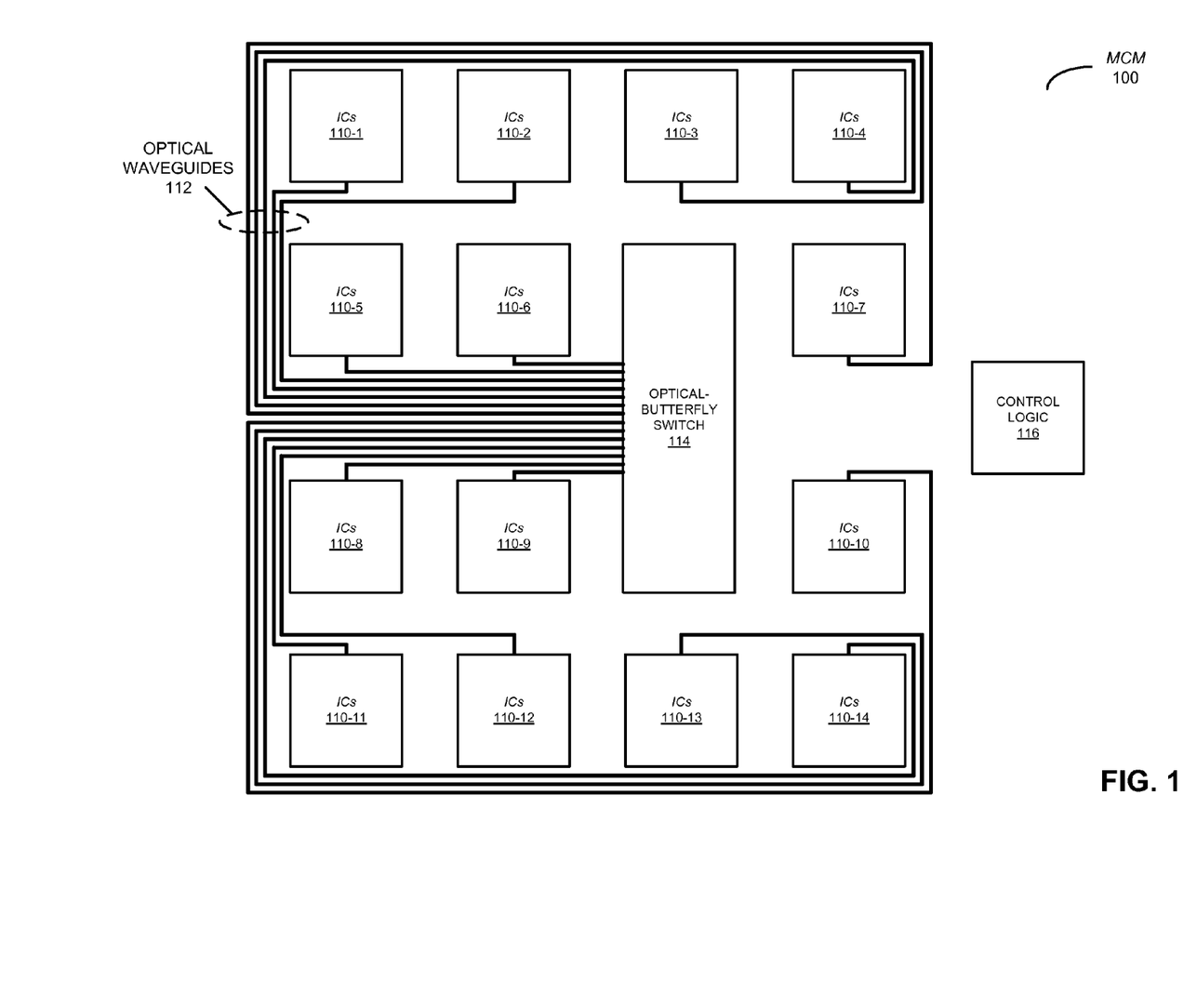
FIG. 1 is a block diagram illustrating a multi-chip module (MCM) in accordance with an embodiment of the present disclosure.

We now describe embodiments of the MCM. FIG. 1 presents a block diagram illustrating an MCM 100, which is sometimes referred to as a 'macrochip.' This MCM includes: integrated circuits (ICs) 110 (such as processors and/or memory chips) that perform electrical-to-optical conversion based on data to provide modulated optical signals and receive data in the modulated optical signals by performing optical-to-electrical conversion; optical waveguides 112, in a plane 410 (FIG. 4), which convey the modulated optical signals among integrated circuits 110; and a crossing-free optical-butterfly switch 114, optically coupled to optical waveguides 112, which dynamically allocates communication bandwidth among integrated circuits 110. Note that, after being provided by provided by at least one of integrated circuits 110, communication of the modulated optical signals to one or more of integrated circuits 110 within MCM 100 may not involve intermediate electrical-to-optical conversions.

Figure 4:
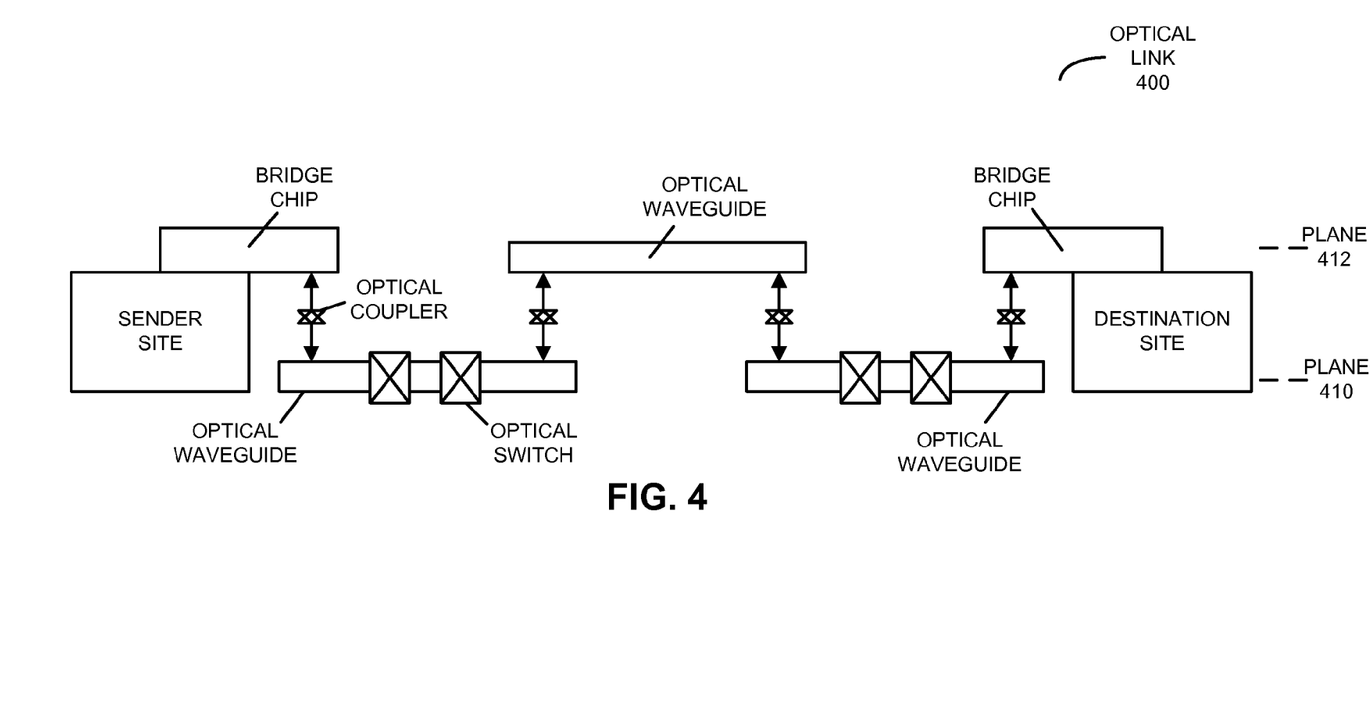
FIG. 4 is a block diagram illustrating a two-layer optical link in the MCM of FIG. 1 in accordance with an embodiment of the present disclosure.
Figure 5:
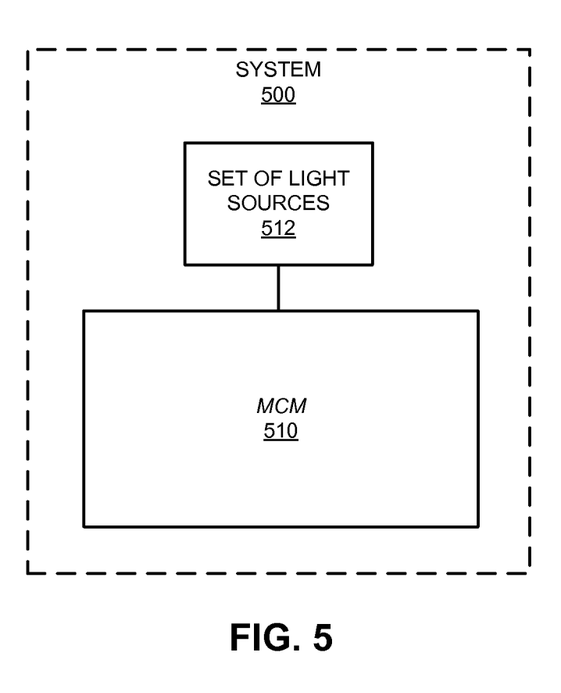
FIG. 5 is a block diagram illustrating a system that includes an MCM in accordance with an embodiment of the present disclosure.

As illustrated in FIG. 5, optical waveguides or optical fibers may convey optical signals from a set of light sources 512 (FIG. 5) that are external to MCM 100 to integrated circuits 110. Moreover, integrated circuits 110 may receive the optical signals, and may provide and receive the modulated optical signals when communicating information or data among integrated circuits 110. For example, a transmitter in a given integrated circuit may modulate a carrier wavelength in an optical signal from an external light source using a ring-resonator modulator, an electro-optical modulator or a Mach-Zehnder interferometer optical modulator, and a wavelength-selective drop filter in a receiver in the given integrated circuit may receive a modulated optical signal from another integrated circuit. In an exemplary embodiment, MCM 100 includes 14 integrated circuits 110, and two sites are used for optical-butterfly switch 114. (However, in other embodiments the 4×4 MCM is fully populated with 16 integrated circuits at the expense of additional area for optical-butterfly switch 114.) Note that optical waveguides 112 may be in a single routing layer (such as plane 410 in FIG. 4), and inter-layer couplers at integrated circuits 110 may redirect the optical signals and the modulated optical signals to plane 412 (FIG. 4), which contains transmitters and receivers. Alternatively, as shown in FIG. 4, optical waveguides 112 may be implemented in two layers (such as planes 410 and 412 in FIG. 4).

Figure 2:
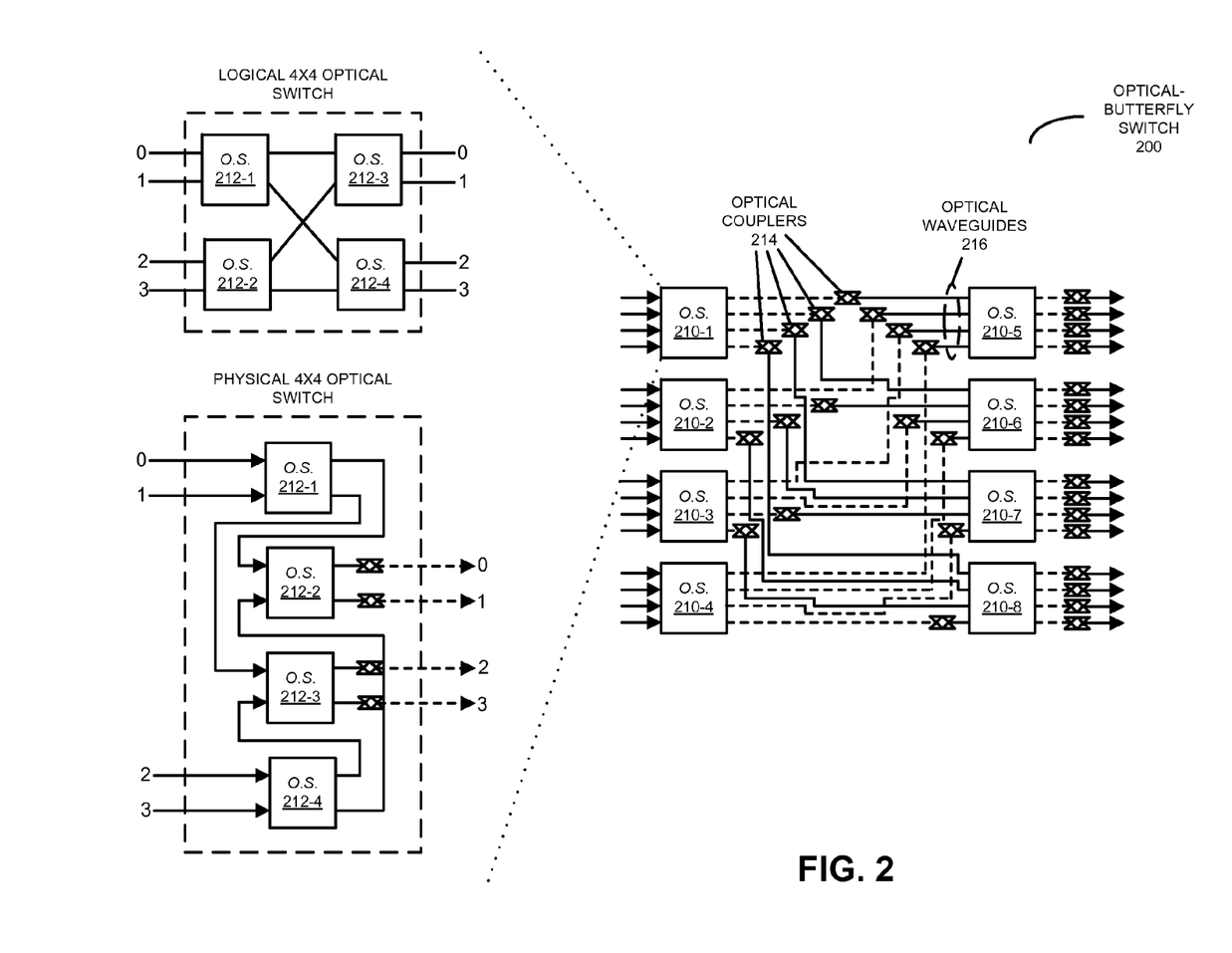
FIG. 2 is a block diagram illustrating a crossing-free optical-butterfly switch in the MCM of FIG. 1 in accordance with an embodiment of the present disclosure.

During operation of MCM 100, crossing-free optical-butterfly switch 114 communicates the modulated optical signals among integrated circuits 110 without optical-waveguide crossings in a single layer or plane to reduce signal loss and to eliminate crosstalk. In particular, 2×2 optical switches (with two input optical waveguides and two output optical waveguides) may be used as building blocks in 4×4 optical switches, which are then used to construct larger optical-butterfly switches. This is illustrated in FIG. 2, which shows an implementation of a 16×16 crossing-free optical-butterfly switch 200. Optical-butterfly switch 200 may include optical components (such as optical switches 210 and 212, and optical waveguides 216) in plane 410 (FIG. 4) and plane 412 (FIG. 4), and optical couplers 214 that couple the modulated optical signals to and from plane 410 (FIG. 4) and plane 412 (FIG. 4). (In FIG. 2, each of the optical waveguides in plane 410 are indicated by solid lines and each of the optical waveguides in plane 412 are indicated by dashed lines.) For example, optical couplers 214 may include inter-layer optical couplers, such as: a mirror, a diffraction grating and/or an optical proximity connector. Because inter-layer optical couplers, optical switches and optical waveguides can also cause signal loss, optical-butterfly switch 200 may include a minimum number of optical couplers 214 to avoid optical-waveguide crossings in the single layer or plane and/or the length of the optical waveguide in MCM 100 (FIG. 1) along the worst-case (longest) optical path may be minimized (thereby minimizing the overall optical-link signal loss). In an exemplary embodiment, optical couplers 214 (and optical switches 212, which are described below) each have a signal loss less than 1.5 dB.

Optical-butterfly switch 200 may include N optical switches (O.S.es) 210 having M input ports and M output ports, where the input ports are in plane 410 (FIG. 4) and the output ports are in plane 412 (FIG. 4); and M optical waveguides 216 for the M output ports from each of optical switches 210. Moreover, a given one of the N optical switches 210 may include M optical couplers 214 coupled to its M optical waveguides 216. In particular, optical-butterfly switch 200 may receive the modulated optical signals in plane 410 (FIG. 4) and output the modulated optical signals in plane 410 (FIG. 4). Therefore, optical couplers 214 between the N optical switches 210 may couple the modulated optical signals output by the N optical switches 210 in plane 412 (FIG. 4) to plane 410 (FIG. 4). Note that the location of optical couplers 214 may be selected to avoid in-plane optical-waveguide crossings in a given plane (such as plane 410 or 412 in FIG. 4).

Additionally, the given one of the N optical switches 210 may include I optical switches 212 having J input ports and J output ports in plane 410 (FIG. 4). For example, I may be 4 and J may be 2. Thus, each of the N optical switches 210 may include multiple 2×2 optical switches that provide a logical 4×4 switch. Moreover, N may be 8 and M may be 4 so that optical-butterfly switch 200 has a total of 16 input ports and 16 output ports (i.e., optical-butterfly switch 200 may have 16 nodes). Furthermore, in an exemplary embodiment, a given one of the I optical switches 212 includes a Mach-Zehnder interferometer.

Figure 3:
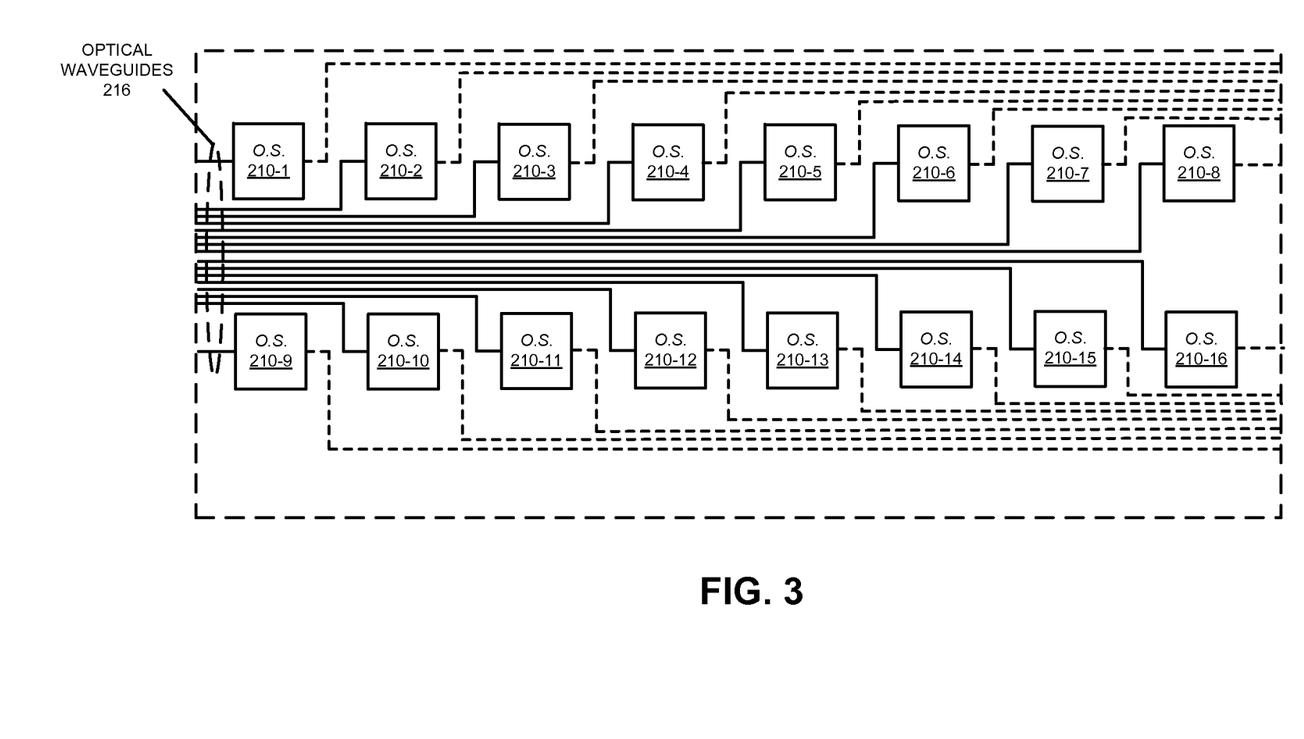
FIG. 3 is a block diagram illustrating a configuration of 4×4 optical switches in a single optical link in the crossing-free optical-butterfly switch of FIG. 2 in accordance with an embodiment of the present disclosure.

The number of optical waveguides 216 used in a given implementation of the optical-butterfly switch may depend on the desired communication bandwidth and the available optical power after optical-link losses. This is shown in FIG. 3, which presents a block diagram illustrating a configuration of 4×4 optical switches in a single optical link in a crossing-free optical-butterfly switch 200 (FIG. 2). Note that this configuration provides a space-efficient arrangement of multiple 4×4 optical switches for a system in which many optical waveguides are used for each logical optical link. In particular, multiple stages of 4×4 optical switches may be used with 16 parallel optical waveguides to allow the communication bandwidth to be increased (in this case, up to 16×) while minimizing the additional area needed. Thus, in some embodiments, there may be K optical waveguides 216 for each of the M logical ports from each of optical switches 210, but in the physical layout there is one optical waveguide for each output port.

FIG. 4 presents a block diagram illustrating a two-layer optical link 400 in a 16×16 optical-butterfly switch, such as optical-butterfly switch 200 (FIG. 2). This optical link includes both of the routing layers (in planes 410 and 412), four optical switches, and the optical couplers used to avoid in-plane optical-waveguide crossings. While FIG. 4 illustrates a two-layer optical link, as noted previously in other embodiments a single routing layer is used for optical waveguides 112 (FIG. 1) outside of the optical-butterfly switch.

Referring back to FIG. 2, while FIG. 2 shows two columns and a total of eight 4×4 optical switches 210 (i.e., N may be 8 and M may be 4), the number of columns may depend on the desired communication bandwidth. Furthermore, if there are more input/output ports and more stages (and, thus, columns) in the optical-butterfly switch, a different routing may be used. However, in this case the routing between the N optical switches 210 for optical waveguides 216 may be similar to that shown in the middle of FIG. 2, although it may use additional horizontal area.

Note that inter-switch signaling among the N optical switches 210 in optical-butterfly switch 200 may be conveyed optically and/or inter-switch signaling between adjacent pairs of the I optical switches 212 in optical-butterfly switch 200 may be conveyed electrically. For example, each of the N optical switches 210 may have associated control logic (not shown) to receive circuit setup requests transmitted optically from integrated circuits 110 in FIG. 1 (which is described further below). For clarity, the optical waveguides used for control are not shown in FIG. 2. In an exemplary embodiment, the control logic is located in layer or plane 412 (FIG. 4), and it controls the optical switches through a short-range inter-layer electronic connection.

Referring back to FIG. 1, in some embodiments optical waveguides 112 and optical-butterfly switch 114 are implemented in a semiconductor layer on the substrate, and the optical signals or light in these optical waveguides may be highly confined because of the big difference between the index of refraction of the semiconductor layer and the surrounding material. While a wide variety of materials can be used in the semiconductor layer, in an exemplary embodiment silicon is used. Furthermore, this silicon semiconductor layer may be disposed on a buried-oxide layer which, in turn, is disposed on the substrate. Once again, a wide variety of materials may be used in the substrate, such as a semiconductor, glass or plastic. In an exemplary embodiment, silicon is used in the substrate, along with silicon dioxide in the buried-oxide layer. Consequently, in some embodiments, the substrate, the buried-oxide layer and the semiconductor layer may comprise a silicon-on-insulator (SOI) technology.

In an exemplary embodiment, optical waveguides 112 convey optical signals (i.e., light) having carrier wavelengths between 1.1-1.7 µm, such as an optical signal having a fundamental carrier wavelength of 1.3 or 1.55 µm. These optical waveguides may have thicknesses between 0.25 and 3 µm, and widths between 0.5 and 3 µm. Note that because optical waveguides 112 may have quasi-rectangular cross-sections, they may be quasi-single mode components. Moreover, the buried-oxide layer may have a thickness between 0.3 and 3 µm.

In the preceding discussion, an MCM with 14 integrated circuits 110 (FIG. 1) and an optical-butterfly switch with 16 nodes was used as an illustration. In other embodiments, the MCM includes 8×8 sites, with 56 integrated circuits and eight sites are used to implement a 56×56 optical-butterfly switch. (However, in other embodiments the 8×8 MCM is fully populated with 64 integrated circuits at the expense of additional area for a 64×64 optical-butterfly switch 114.) This optical-butterfly switch will include more optical couplers and optical switches than the 16×16 implementation to avoid optical-waveguide crossings. In addition, it may require lower optical-signal-loss per optical switch. Because the associated optical-link signal loss increases with the number of optical couplers, this design may require lower optical signal loss per optical coupler.

In some embodiments, MCM 100 includes control logic 116 to configure optical-butterfly switch 114 to dynamically allocate communication bandwidth among integrated circuits 110. Note that control logic 116 may be centralized (as shown) or distributed. Furthermore, optical waveguides (not shown) may convey control information to optical-butterfly switch 114. In an exemplary embodiment, the control information for each of integrated circuits 110 and each optical-switch pair in optical-butterfly switch 114 is conveyed using two carrier wavelengths. Additionally, a sending integrated circuit may set up a complete circuit to its intended destination before sending any data via optical waveguides 112. This dynamic allocation approach may provide significant energy and performance improvements relative to a statically allocated optical network.

As an illustration of the operation of crossing-free optical-butterfly switch 114, integrated circuit 110-1 may wish to send data to integrated circuit 110-14. In operation A, integrated circuit 110-1 may send a control message to optical switch 210-1 (FIG. 2) requesting a circuit to integrated circuit 110-14. Then, in operation B, optical switch 210-1 (FIG. 2) may arbitrate to handle blocking requests. If the optical-switch control logic on optical switch 210-1 (FIG. 2) determines that the internal link to its output port for optical switch 210-8 (FIG. 2) is not available, it may send a negative acknowledgment to integrated circuit 110-1, which may try again after a back-off period. If the resources are available, optical switch 210-1 (FIG. 2) may reserve them and may optically send a request to optical switch 210-8 (FIG. 2). Moreover, optical switch 210-8 (FIG. 2) may repeat this operation in operation C, with optical switch 210-8 (FIG. 2) sending an acknowledgment back to optical switch 210-1 (FIG. 2) upon success. Next, in operation D, optical switch 210-1 (FIG. 2) notifies integrated circuit 110-1 that the complete circuit is reserved. Finally, in operation E, integrated circuit 110-1 may begin to send data on its output port through the circuit to integrated circuit 110-14.

Note that the optical network may be blocking. Therefore, there are cases where two messages from different sources to two different destinations may contend for resources inside optical-butterfly switch 114, delaying one of the messages. As a consequence, the optical network may be best suited for workloads with large messages, in which each site communicates with a small number of other sites simultaneously. Note that a variety of techniques known to one of skill in the art may be used to reduce the blocking probability, such as including a sorting network before the N optical switches 210 (FIG. 2) or by adding additional optical switches.

Thus, given a message traffic pattern that involves high site-to-site communication bandwidth for a small number of simultaneous communication partners, the optical network in MCM 100 (FIG. 1) may provide maximum optical-link utilization. Moreover, the energy-delay product for the described optical network (which may be calculated by multiplying the energy consumed during the execution by the execution time) may be significantly lower than a point-to-point optical network. Furthermore, the optical network may arbitrate for switch resources using messages, and so may not require a global clock.

The preceding embodiments of the MCM may be used in a variety of applications. This is shown in FIG. 5, which presents a block diagram illustrating a system 500 that includes an MCM 510 and set of light sources 512 that output optical signals having carrier wavelengths. For example, set of light sources 512 may include tunable-carrier wavelength lasers that can be tuned to any carrier wavelength in the usable spectrum or non-tunable lasers having fixed carrier wavelengths. This set of light sources may be optically coupled to MCM 510 by optical fiber(s).

System 500 may include: a VLSI circuit, a switch, a hub, a bridge, a router, a communication system, a storage area optical network, a data center, an optical network (such as a local area optical network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device (such as a tablet computer), a supercomputer, an optical network-attached-storage (NAS) system, a storage-area-network (SAN) system, and/or another electronic computing device. Note that a given computer system may be at one location or may be distributed over multiple, geographically dispersed locations.

The preceding embodiments of the MCM, as well as system 500, may include fewer components or additional components. Although these embodiments are illustrated as having a number of discrete items, these MCMs and the system are intended to be functional descriptions of the various features that may be present rather than structural schematics of the embodiments described herein. Consequently, in these embodiments two or more components may be combined into a single component, and/or a position of one or more components may be changed. For example, set of light sources 512 may be included on the MCM. In addition, functionality in the preceding embodiments of the MCMs and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular components, configurations and optical network architectures, a wide variety of additional variations to the optical network in the embodiments of the MCM may be used, as is known to one of skill in the art, including: the use of additional or fewer components, arbitration techniques (as needed), etc.

Figure 6:
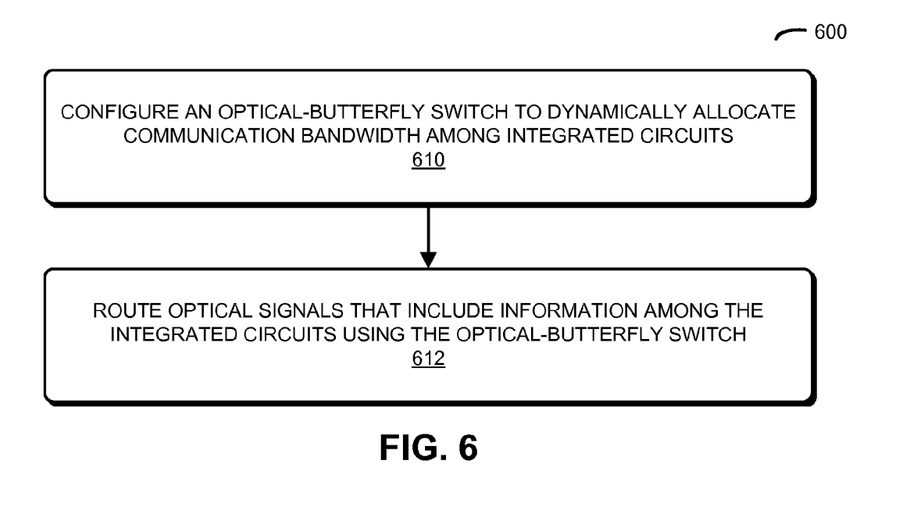
FIG. 6 is a flow chart illustrating a method for communicating information in an MCM in accordance with an embodiment of the present disclosure.

We now describe the method. FIG. 6 presents a flow chart illustrating a method 600 for communicating information in an MCM. During the method, an optical-butterfly switch is configured to dynamically allocate communication bandwidth among the integrated circuits (operation 610). Then, modulated optical signals that include the information are routed among the integrated circuits using the optical-butterfly switch (operation 612), where the optical-butterfly switch is implemented using optical components in a first plane and a second plane, and optical couplers that couple the modulated optical signals to and from the first plane and the second plane. Moreover, the modulated optical signals are communicated among the integrated circuits without optical-waveguide crossings in a given plane.

In some embodiments of method 600, there are additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A multi-chip module (MCM), comprising:
    integrated circuits configured to perform electrical-to-optical conversion based on data to provide modulated optical signals, and configured to receive data in the modulated optical signals by performing optical-to-electrical conversion;
    optical waveguides, in a first plane, configured to convey the modulated optical signals among the integrated circuits; and
    a crossing-free optical-butterfly switch, optically coupled to the optical waveguides, configured to dynamically allocate communication bandwidth among the integrated circuits, wherein the optical-butterfly switch comprises optical components in the first plane and a second plane, and optical couplers configured to couple the modulated optical signals to and from the first plane and the second plane, wherein all optical switches in the crossing-free optical-butterfly switch are located in a same plane; and
    wherein the MCM is configured to communicate the modulated optical signals among the integrated circuits without optical-waveguide crossings in a given plane.

2. The MCM of claim 1, wherein the optical-butterfly switch comprises a minimum number of optical couplers to avoid optical-waveguide crossings in the given plane.

3. The MCM of claim 1, wherein the optical-butterfly switch comprises:
    N first optical switches having M input ports and M output ports, wherein the input ports are in the first plane and the output ports are in the second plane; and
    M second optical waveguides for the M output ports from each of the N first optical switches.

4. The MCM of claim 3, wherein a given first optical switch comprises M optical couplers.

5. The MCM of claim 3, wherein the optical-butterfly switch is configured to receive the modulated optical signals in the first plane and to output the modulated optical signals in the first plane.

6. The MCM of claim 5, wherein the optical couplers in the optical-butterfly switch are configured to couple the modulated optical signals output by the N first optical switches in the second plane to the first plane.

7. The MCM of claim 3, wherein a given first optical switch comprises I second optical switches having J input ports and J output ports in the first plane.

8. The MCM of claim 7, wherein I is 4, J is 2, N is 8 and M is 4 so that the optical-butterfly switch has a total of 16 input ports and 16 output ports.

9. The MCM of claim 7, wherein inter-switch signaling between adjacent second optical switches in the optical-butterfly switch is conveyed electrically.

10. The MCM of claim 7, wherein a given second optical switch comprises a Mach-Zehnder interferometer.

11. The MCM of claim 3, wherein inter-switch signaling among the N first optical switches in the optical-butterfly switch is conveyed optically.

12. The MCM of claim 1, further comprising control logic to configure the optical-butterfly switch to dynamically allocate communication bandwidth among the integrated circuits.

13. The MCM of claim 1, wherein the first optical waveguides and the optical-butterfly switch are implemented on a substrate using silicon-on-insulator technology.

14. A system, comprising:
    a set of light sources configured to output optical signals having carrier wavelengths; and
    a multi-chip module (MCM) optically coupled to the set of light sources, wherein the MCM comprises:
    integrated circuits configured to: receive the optical signals, perform electrical-to-optical conversion based on data to provide modulated optical signals, and receive data in the modulated optical signals by performing optical-to-electrical conversion;
    optical waveguides, in a first plane, configured to convey the modulated optical signals among the integrated circuits; and
    a crossing-free optical-butterfly switch, optically coupled to the optical waveguides, configured to dynamically allocate communication bandwidth among the integrated circuits, wherein the optical-butterfly switch comprises optical components in the first plane and a second plane, and optical couplers configured to couple the modulated optical signals to and from the first plane and the second plane, wherein all optical switches in the crossing-free optical-butterfly switch are located in a same plane; and
    wherein the MCM is configured to communicate the modulated optical signals among the integrated circuits without optical-waveguide crossings in a given plane.

15. The system of claim 14, wherein the optical-butterfly switch comprises:
    N first optical switches having M input ports and M output ports, wherein the input ports are in the first plane and the output ports are in the second plane, and wherein a given first optical switch comprises M optical couplers; and
    M second optical waveguides for the M output ports from each of the N first optical switches.

16. The system of claim 15, wherein the optical couplers in the optical-butterfly switch are configured to couple the modulated optical signals output by the N first optical switches in the second plane to the first plane so that the optical-butterfly switch receives the modulated optical signals in the first plane and outputs the modulated optical signals in the first plane.

17. The system of claim 16, wherein a given first optical switch comprises I second optical switches having J input ports and J output ports in the first plane.

18. The system of claim 17, wherein a given second optical switch comprises a Mach-Zehnder interferometer.

19. The system of claim 15, further comprising control logic to configure the optical-butterfly switch to dynamically allocate communication bandwidth among the integrated circuits.

20. A method for optically communicating information among integrated circuits in an MCM, the method comprising:

configuring a crossing-free optical-butterfly switch to dynamically allocate communication bandwidth among the integrated circuits; and routing modulated optical signals that include the information among the integrated circuits using the optical-butterfly switch, wherein the optical-butterfly switch is implemented using optical components in a first plane and a second plane, and optical couplers that couple the modulated optical signals to and from the first plane and the second plane, wherein all optical switches in the crossing-free optical-butterfly switch are located in a same plane; and wherein the modulated optical signals are communicated among the integrated circuits without optical-waveguide crossings in a given plane.

* * * * *